R. RUST.
Cultivators.

No. 139,193.  Patented May 20, 1873.

Witnesses.
G. E. Upham.
Jos. B. Loomis.

Inventor:
Reuben Rust,
Chipman Hosmer & Co
Attys

UNITED STATES PATENT OFFICE.

REUBEN RUST, OF ODESSA, DELAWARE.

IMPROVEMENT IN CULTIVATORS.

Specification forming part of Letters Patent No. 139,193, dated May 20, 1873; application filed September 28, 1872.

*To all whom it may concern:*

Be it known that I, REUBEN RUST, of Odessa, in the county of New Castle and State of Delaware, have invented a new and valuable Improvement in Hand-Cultivators; and I do hereby declare that the following is a full, clear, and exact description of the construction and operation of the same, reference being had to the annexed drawing making a part of this specification, and to the letters and figures of reference marked thereon.

Figure 1:
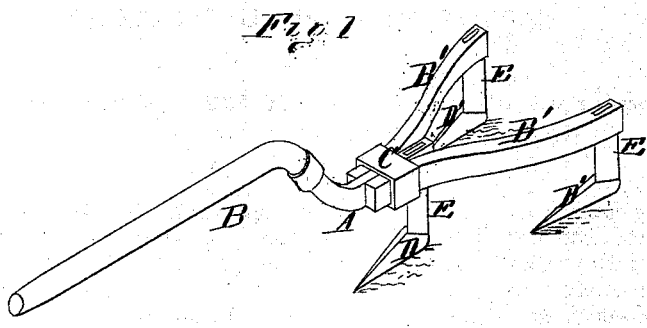
Figure 2:
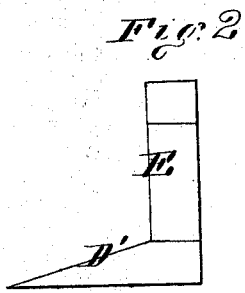

Figure 1 of the drawing is a representation of a perspective view of my invention. Fig. 2 is a side view of one of the teeth.

This invention has relation to hand-cultivators; and consists in the construction and novel arrangement of the teeth and the sectional frame, substantially as and for the purpose hereinafter described.

As shown in the drawing, the frame consists of three parts—the central beam A, to which is attached the tongue or handle B, and the two diverging side beams B', secured to the central beam by a band, C. The teeth, marked D D', are made each in one piece with its shank E, or attached rigidly to it, and preferably of steel. The form of each tooth is that of a triangular, tapering, and pointed block.

The shank rises directly from the heel, and the largest surface of the tooth lies flat on the ground. The tooth is designed to be about three inches wide at the heel and about six inches long. The after or hind teeth D' are secured to the beams B', and the front tooth D to the beam A. By removing the band C the beam A may be separated from the side beams, and the tooth D used by itself. The shape of these teeth causes them to pass easily through the soil, throwing up the earth on each side, and leaving a smooth surface below them.

What I claim as new, and desire to secure by Letters Patent, is—

The hand-cultivator described, having the central beam A, provided with the handle B and tooth D, removable side beams B', and solid triangular-pointed teeth D', having upright shanks E, together with the coupling-band C, substantially as specified.

In testimony that I claim the above I have hereunto subscribed my name in the presence of two witnesses.

REUBEN RUST.

Witnesses:
W. W. ROSE,
CHAS. T. SHALLON.